United States Patent [19]

Lew et al.

[11] Patent Number: 5,392,656
[45] Date of Patent: Feb. 28, 1995

[54] NONVIBRATING CONDUIT INERTIA FORCE FLOWMETER

[76] Inventors: Hyok S. Lew; Yon S. Lew, both of 7890 Oak St., Arvada, Colo. 80005

[21] Appl. No.: 120,555

[22] Filed: Sep. 14, 1993

[51] Int. Cl.$^6$ ............................................. G01F 1/84
[52] U.S. Cl. ................................................. 73/861.37
[58] Field of Search ........... 73/861.18, 861.21, 861.37, 73/861.38

[56] References Cited

U.S. PATENT DOCUMENTS

| | | | |
|---|---|---|---|
| 3,331,244 | 7/1967 | Henderson | 73/861.38 |
| 4,420,983 | 12/1983 | Langdon | 73/861.15 |
| 4,596,153 | 6/1986 | Macdonald et al. | 73/861.18 |
| 4,972,724 | 11/1990 | Ricken | 73/861.37 |

Primary Examiner—Richard F. Chilcot, Jr.
Assistant Examiner—Harshad Patel

[57] ABSTRACT

A mass flowmeter comprises a nonvibrating conduit providing a flow passage divided into two parallel and equal subpassages by a planar member with the leading and trailing edges secured to the wall of the flow passage, wherein the planar member is torsionally vibrated about the central axis thereof substantially coinciding with the center line of the flow passage, and a pair of vibration sensors detecting the torsional vibration of the planar member respectively at two different cross sections of the flow passage, wherein the mass flow rate of media moving through the flow passage is determined as a function of a phase angle difference between two alternating electrical signals respectively provided by the pair of vibration sensors.

20 Claims, 3 Drawing Sheets

NONVIBRATING CONDUIT INERTIA FORCE FLOWMETER

FIELD OF INVENTION

This invention relates to a mass flowmeter of types commonly known as the convective inertia force flowmeter or the Coriolis force flowmeter. The conventional versions of the mass flowmeters of these types traditionally employ a single or a pair of vibrating conduits. This invention teaches a nonvibrating conduit inertia force flowmeter employing a nonvibrating conduit and a planar member disposed within the nonvibrating conduit that divides the flow passage provided by the nonvibrating conduit into two parallel and equal flow passages, wherein the planar member with four corners secured to the wall of the flow passage is torsionally vibrated about the center line of the flow passage and the mass flow rate of media moving through the flow passage is determined as a function of a phase angle difference between two alternating electrical signals representing the torsional vibration of the planar member respectively at two different sections of the planar member.

BACKGROUND OF INVENTION

With few exceptions, the conventional types of mass flowmeters known as the convective inertia force flowmeter or the Coriolis force flowmeter employ a single or a pair of vibrating conduits which are flexurally vibrated by an electromagnetic vibrator disposed at the center section thereof, and determine the mass flow rate of media moving through the conduit or conduits as a function of a phase angle difference between two alternating electrical signals respectively provided by two vibration sensors detecting the flexural vibration of the conduit at two different sections thereof, respectively. As the conduit providing the flow passage for the media has to be flexurally vibrated in the conventional types of the inertia force flowmeters, the construction and operation of these types of the mass flowmeters become prohibitively expensive and ungainly cumbersome when the flowmeters of large port sizes, e.g., greater than 2 inches, are required. As the costs of even small size inertia force flowmeters of the conventional types are unreasonably high, there is a strong demand for a new generation inertia force flowmeter technology that provides inexpensive and compact inertia force flowmeters of all sizes.

BRIEF SUMMARY OF INVENTION

The primary object of the present invention is to provide a inertia force flowmeter comprising a nonvibrating conduit providing a flow passage that is divided into two parallel and equal flow passages by a planar member secured to the wall of the flow passage at the leading and trailing edges of the planar member and torsionally vibrated about the central axis of the planar member substantially coinciding with the center line of the flow passage by an electromagnetic vibrator exerting a vibratory torque to the center section of the planar member, wherein the mass flow rate of media moving through the flow passage is determined as a function of a phase angle difference between two alternating electrical signals respectively provided by two vibration sensors detecting the torsional vibration of the planar member at two different sections of the planar member straddling the center section of the planar member.

Another object is to provide the inertia force flowmeter described in the afore-mentioned primary object of the present invention, wherein the two vibration sensors detect the torsional vibration of the planar member respectively at a first section intermediate the leading edge and the center section of the planar member and at a second section intermediate the center section and the trailing edge of the planar member.

A further object is to provide the inertia force flowmeter described in the primary object of the present invention, wherein the two vibration sensors detect the torsional vibration of the planar member respectively at a first section including the leading edge of the planar member and at a second section including the trailing edge of the planar member.

Yet another object is to provide a inertia force flowmeter comprising a nonvibrating conduit providing a flow passage that is divided into two parallel and equal flow passages by a planar member secured to the wall of the flow passage only at the leading edge of the planar member and torsionally vibrated about the central axis of the planar member substantially coinciding with the center line of the flow passage by an electromagnetic vibrator exerting a vibratory torque to trailing edge portion of the planar member, wherein the mass flow rate of media moving through the flow passage is determined as a function of a phase angle difference between two alternating electrical signals respectively provided by two vibration sensors detecting the torsional vibration of the planar member at two sections belonging to the upstream and downstream halves of the planar member, respectively.

Yet a further object is to provide the inertia force flowmeter described in the afore-mentioned yet another object of the present invention, wherein the two vibration sensors detect the torsional vibration of the planar member respectively at a first section including the leading edge of the planar member and at a second section including the trailing edge of the planar member.

Still another object is to provide a inertia force flowmeter described by one of the afore-mentioned objects of the present invention, wherein the planar member is further supported by at least one supporting structure anchored to and extending from the wall of the flow passage in a relationship allowing at least a minute amount of pivotal movement of the planar member about the central axis thereof substantially coinciding with the center line of the flow passage.

Still a further object is to provide a modified version of the inertia force flowmeter described by one of the afore-mentioned objects of the present invention, wherein the electromagnetic vibrator exerts a vibratory force acting linearly in directions substantially perpendicular to the planar member instead of the vibratory torque about the central axis of the planar member, and generates a linear flexural vibration of the planar member in directions substantially perpendicular to the planar member instead of the torsional vibration of the planar member about the central axis thereof, and the two vibration sensors detects the linear flexural vibration of the planar member at two different sections thereof instead of the torsional vibration.

These and other objects of the present invention will become clear as the description of the invention progresses.

BRIEF DESCRIPTION OF FIGURES

The present invention may be described with a greater clarity and specificity by referring to the following figures.

OPERATING PRINCIPLES

The equation of motion of media moving through a flow passage provided by a conduit and the equation of motion of a planar member dividing the flow passage into two parallel and equal flow passages and under a torsional vibration about the center line of the flow passage, can be combined to obtain an equation governing the combined motion of the media moving through the flow passage and the planar member under the torsional vibration dividing the flow passage, $$2EJ\frac{\partial^4 \phi}{\partial x^4} + (\rho \pi R^2 + m)\frac{\partial^2 \phi}{\partial t^2} + \dot{M}\frac{\partial^2 \phi}{\partial x \partial t} = 0, \quad (1)$$

where E is the modulus of elasticity of the material making up the planar member, J is the polar moment of inertia of the cross section of the planar member about the central axis thereof coinciding with the center line of flow passage, $\phi$ is the deflection angle of the planar member about the central axis thereof, x is the distance measured along the center line of the flow passage, $\rho$ is the density of media moving through the flow passage, R is the radius of the cross section of the flow passage, m is the mass of the planar member per unit length thereof, t is the time, and $\dot{M}$ is the mass flow rate of the media. In the particular case related to the measurement of mass flow rate of media moving through the conduit, the resultant angular deflection $\phi$ is composed of the primary torsional deflection $\phi_0$ created by a vibratory torque about the center line of the flow passage exerted by an electromagnetic vibrator, and the secondary torsional deflection $\phi_1$ resulting from a dynamic interaction between the primary torsional deflection $\phi_0$ and the convective motion of the media characterized by the mass flow rate $\dot{M}$. It is readily recognized that the primary and secondary torsional deflections $\phi_0$ and $\phi_1$ respectively satisfy the following components of equation (1):

$$2EJ\frac{\partial^4 \phi_0}{\partial x^4} + (\rho S + m)\frac{\partial^2 \phi_0}{\partial t^2} = 0, \quad (2)$$

and $$2EJ\frac{\partial^4 \phi_1}{\partial x^4} + (\rho S + m)\frac{\partial^2 \phi_1}{\partial t^2} = -\dot{M}\frac{\partial^2 \phi_0}{\partial x \partial t}, \quad (3)$$

where S is the cross sectional area of the flow passage. In general, the resultant torsional deflection $\phi$ can be described by equation $$\phi(x,t) = \phi_0(x)\cos\omega t + \frac{\omega \dot{M}}{2EJ}\phi_1(x)\sin\omega t, \quad (4)$$

where the first and second terms appearing on the right-hand-side of the equation respectively represent the primary and secondary torsional vibration of the planar member, and $\omega$ is the circular frequency of the torsional vibration of the conduit, that is equal to the circular frequency of the vibratory torque exerted by the electromagnetic vibrator. Of course, the primary and secondary torsional vibrations $\phi_0$ and $\phi_1$ must respectively satisfy the appropriate boundary conditions set forth at the leading and trailing edges of the planar member. Substitution of equation (4) into equation (3) yields equation $$\frac{d^4 \phi_1}{dx^4} - \frac{\rho S + m}{2EJ}\omega^2 \phi_1 = \frac{d\phi_0}{dx}. \quad (5)$$

When the electromagnetic vibrator exerts the vibratory torque at a frequency $\omega$ given by equation $$\omega = K\sqrt{\frac{2EJ}{\rho S + m}}, \quad (6)$$

where K is a constant, equation (5) reduces to $$\frac{d^4\phi_1}{dx^4} - K^2\phi_1 = \frac{d\phi_0}{dx}, \tag{7}$$

which equation together with the boundary conditions specified at the leading and trailing edges of the planar member determines the spatial distribution $\phi_1(x)$ of the secondary torsional vibration of the planar member. Of course, the spatial distribution $\phi_0(x)$ of the primary torsional vibration is determined by equation (2) together with the boundary conditions specified at the leading and trailing edges of the planar member. Equation (4) can be written in the form $$\phi(x,t) = A(x)\{\cos[\omega t - \psi(x)]\}, \tag{8}$$

where $$A(x) = \sqrt{[\phi_0(x)]^2 + \left[\frac{\omega \dot{M}}{2EJ}\phi_1(x)\right]^2}, \tag{9}$$

and $$\tan\psi(x) = \frac{\phi_1(x)}{\phi_0(x)} \frac{\omega \dot{M}}{2EJ}. \tag{10}$$

The torsional vibration of the planar member given by equation (9) is converted to two alternating electrical signals respectively given by the following two equations by a pair of vibration or motion sensors respectively located at two different positions $x=a$ and $x=b$:

$$E_a(t) = \alpha A(a)\cos[\omega t - \psi(a)], \tag{11}$$

and $$E_b(t) = \beta A(b)\cos[\omega t - \psi(b)], \tag{12}$$

where $\alpha$ and $\beta$ are amplification factors of the two vibration or motion sensors, and $$\tan\psi(a) = \frac{\phi_1(a)}{\phi_0(a)} \frac{\omega \dot{M}}{2EJ}, \tag{13}$$

and $$\tan\psi(b) = \frac{\phi_1(b)}{\phi_0(b)} \frac{\omega \dot{M}}{2EJ}. \tag{14}$$

It follows from equations (13) and (14) that the mass flow rate of media moving through a flow passage provided by a nonvibrating conduit can be determined as a function of an additive or differential combination of the tangents of the phase angles of the two alternating electrical signals representing the torsional vibration of the planar member at two different sections of the flow passage, i.e., $$\dot{M} = \frac{2EJ}{\omega}\left[\frac{\phi_0(a)}{\phi_1(a)}\tan\psi(a) \pm \frac{\phi_0(b)}{\phi_1(b)}\tan\psi(b)\right], \tag{15}$$

where one of the plus and minus signs must be elected so that the resultant combination of the two phase angles $\omega(a)$ and $\omega(b)$ becomes a differential combination thereof. When the two vibration or motion sensors are located symmetrically about the center section of the planar member whereat the vibratory torque is exerted, equation (15) reduces to $$\dot{M} = C[\tan\omega(a) - \tan\omega(b)], \tag{16}$$

where C is a constant of proportionality given by equation $$C = \frac{2EJ}{\omega}\frac{\phi_0}{\phi_1}. \tag{17}$$

When the phase angle difference between the two alternating electrical signals $[\omega(a) - \omega(b)]$ is less than 10 degrees, equation (17) can be approximated by equation $$\dot{M} = C\tan[\omega(a) - \omega(b)]. \tag{18}$$

When the phase angle difference between the two alternating electrical signals is less than 5 degrees, equation (17) can be approximated by equation $$\dot{M} = C[\omega(a) - \omega(b)]. \tag{19}$$

According to equations (15), (16), (17) and (18), the mass flow rate of media moving through the flow passage divided into two parallel subpassages by a planar member under a torsional vibration can be determined as a function of a phase angle difference between two alternating electrical signals representing the torsional vibration of the planar member at two different sections of the flow passage. In actual practice of the invention, the mathematical relationship between the mass flow rate of media and the phase angle difference between the two alternating electrical signals should be obtained empirically by calibrating the nonvibrating conduit inertia force flowmeter operating on the principles of the present invention. The phase angle difference between the two alternating electrical signals may be determined by measuring the time interval between two adjacent zero crossings respectively occurring with the two alternating electrical signals, or by taking a ratio of a first value of one of the two alternating electrical signal occurring at an instant when the other of the two alternating electricals reaches a zero value to a second value of the one alternating electrical signal occurring at another instant when the other alternating electrical reaches a peak value, or by any other method for determining the phase angle difference between two alternating electrical signals known at the present time or to become available in the future.

DESCRIPTION OF ILLUSTRATED EMBODIMENTS

Figures 1, 2, 3, 4:
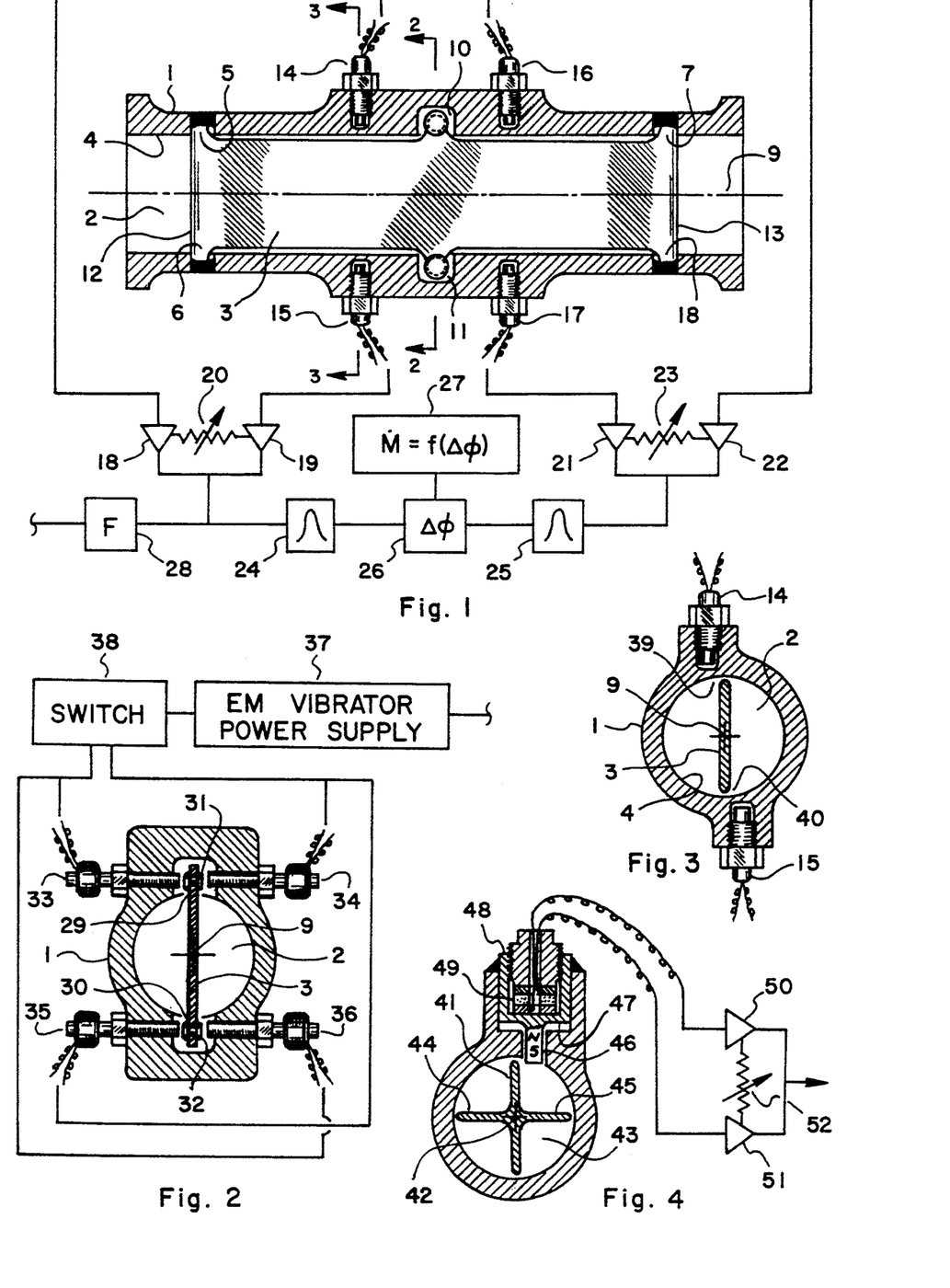
FIG. 1 illustrates a cross section of an embodiment of the nonvibrating conduit inertia force flowmeter of the present invention, comprising a planar member secured to the wall of the nonvibrating conduit at the leading and trailing edges thereof and dividing the flow passage provided by the nonvibrating conduit into two parallel and equal flow passages, wherein the planar member is torsionally vibrated about the central axis thereof coinciding with the center line of the flow passage.
FIG. 2 illustrates another cross section of the nonvibrating conduit inertia force flowmeter shown in FIG. 1.
FIG. 3 illustrates a further cross section of the nonvibrating conduit inertia force flowmeter shown in FIG. 1.
FIG. 4 illustrates a cross section of an embodiment of the vibration sensor performing the same function as the vibration sensor shown in FIG. 3.

In FIG. 1 there is illustrated a cross section of an embodiment of the nonvibrating conduit inertia force flowmeter of the present invention, that operates on the principles described in the preceding article. A flowmeter body 1 or a section of conduit provides a flow passage 2 having a substantially circular cross section, wherein the flow passage 2 is divided into two parallel and equal subpassages by a planar member 3 of an oblong rectangular geometry having a width slightly less than the diameter of the flow passage 2 and a length substantially greater than the width thereof. It should be understood that the flow passage may have other cross sectional geometry different from a circular shape and the width of the planar member may be significantly smaller than the cross sectional dimension of the flow passage, as the present invention can be practiced with a planar member under the torsional vibration about the central axis thereof or under a linear lateral flexural vibration in directions perpendicular to the planar member, which planar member is disposed in a fluid stream unbounded by any physical boundary such as a wall or bounded by a physical boundary distant from the planar member. The planar member 3 is secured to the wall 4 of the flow passage 2 at the leading and trailing edges thereof. In the particular illustrative embodiment, the two leading edge portions 5 and 6 and the two trailing edge portions 7 and 8 of the two opposite side edges of the planar member 3 are secured to the wall 4 of the flow passage 2. The planar member 3 may be supported solely or in complementary manner to the anchoring of the four corners thereof at one or more locations coinciding with the central axis 9 of the planar member 3 substantially coinciding with the center line of the flow passage 2 in a relationship allowing at least a minute amount of torsional vibration of the planar member 3 about the central axis thereof. It should be noticed that the center of the cross section of the planar member 3 is located on the center line 9 of the flow passage 2 over the entire length of the planar member 3. An electromagnetic vibrator comprising elements 10 and 11 exerts a vibratory torque about the central axis 9 to a center section of the planar member 3 intermediate the leading edge 12 and the trailing edge 13. A first pair of vibration or motion sensors 14 and 15 detect the torsional vibration of the planar member 3 about the central axis 9 at a first cross section of the flow passage 2 upstream of the center section of the planar member 3, while a second pair of vibration or motion sensors 16 and 17 detect the torsional vibration of the planar member 3 at a second cross section of the flow passage 2 downstream of the center section of the planar member 3. The two alternating electrical signals respectively generated by the first pair of vibration sensors 14 and 15 are combined by a first pair of amplifiers 18 and 19 with a signal level balancing device 20 to obtain a first alternating electrical signal such as that given by equation (11) appearing in the preceding article, while the two alternating electrical signals respectively generated by the second pair of vibration sensors 16 and 17 are combined by a second pair of amplifiers 21 and 22 with a signal level balancing device 23 to obtain a second alternating electrical signal such as that given by equation (12) appearing in the preceding article. The first and second alternating electrical signals may be conditioned respectively by two band pass filters 24 and 25 before being directed to a signal processor 26 determining a phase angle difference between the first and second alternating electrical signals or other electrical variables related to the phase angle difference. A data processor 27 determines the mass flow rate of media moving through the flow passage 2 as a function of the phase angle difference or of an electrical variable related to the phase angle difference, that is supplied by the signal processor 26. A frequency or zero-crossing detector 28 provides the information about the natural frequency of the torsional vibration of the planar member 3 about its central axis given by equation (6) appearing in the preceding article.

In FIG. 2 there is illustrated another cross section of the nonvibrating conduit inertia force flowmeter shown in FIG. 1, which cross section taken along plane 2—2 as shown in FIG. 1 illustrates an embodiment of the electromagnetic vibrator exerting a vibratory torque about the central axis 9 of the planar member 3 to the center section of the planar member 3 intermediate the leading and trailing edges 12 and 13. The two opposite side edges of the planar member 3 respectively include two stub extensions 29 and 30 located at the center section thereof, which two stub extensions 29 and 30 respectively include two ferromagnetic buttons 31 and 32 affixed thereto. The first ferromagnetic button 31 is disposed intermediate a first pair of electromagnets 33 and 34, while the second ferromagnetic button 32 is disposed intermediate a second pair of electromagnets 35 and 36. The combination of an electromagnet power supply 37 receiving the information about the natural frequency of the torsional vibration of the planar member 3 from the device 28 shown in FIG. 1 and a switching device 38 energizes the electromagnets 33 and 36 with the positive half of an alternating electric current oscillating at the natural frequency of the torsional vibration of the planr member 3, and energizes the electromagnets 34 and 35 with the negative half of the alternating electric current. As a consequence, the planar member 3 experiences a torsional vibration about the central axis 9 thereof occurring at the natural frequency of the torsional vibration thereof. The particular illustrative embodiment works best when the body 1 of the flowmeter and the planar member 3 are made of a nonmagnetic metal such as a 300 series stainless steel or aluminum, or a plastic material, while the ferromagnetic buttons 31 and 32 are made of a 400 series stainless steel. In a modified version of the particular illustrative embodiment, the stub extensions 29 and 30 or the entire planar member 3 may be made of a ferromagnetic material such as a 400 series stainless steel, and the ferromagnetic buttons 31 and 32 may be omitted. It should be understood that two of the four electromagnets such as a pair 34 and 35 may be omitted without sacrificing the efficiency of generating the torsional vibration of the planar member 3. When the planar member 3 is further supported at location or locations along the central axis 9 thereof as exemplified by the embodiment shown in FIG. 11, only a single electromagnet out of the four electromagnets making up the electromagnetic vibrator may be retained, wherein the single electromagnet is energized by an alternating electric current oscillating at a frequency equal to one half of the natural frequency of the torsional vibration of the planar member 3.

In FIG. 3 there is illustrated a further cross section of the nonvibrating conduit inertia force flowmeter shown in FIG. 1, which cross section taken along plane 3—3 as shown in FIG. 1 illustrates an embodiment of the vibration or motion sensor generating an alternating electrical signal representing the torsional vibration of the planar member 3 occurring at a cross section of the flow passage whereat the vibration sensor is disposed. A pair of motion sensors 14 and 15 of the magnetic induction type are disposed at two diametrically opposite portions of the wall 4 of the flow passage 2 in a relationship respectively adjacent to the two opposite side edges of the planar member 3. As the distance between the tip of the motion sensor and the side edge of the planar member 3 changes due to the torsional vibration of the planar member 3 about the central axis 9 thereof, the intensity of the magnetic flux extending through the electric coil included in the tip of the motion sensor varies and, consequently, an electromotive force is induced in the electric coil in a mode representing the torsional vibration of the planar member 3. In the particular illustrative embodiment, the two opposite side edge portions or the entire planar member 3 must be made of a ferromagnetic material such as a 400 series stainless steel or a carbon steel. The two motion sensors 14 and 15 may be disposed on planes slightly offset from a plane defined by the planar member 3 as shown in the particular illustrative embodiment, or they may be disposed in a relationship coplanar to the planar member 3 in an alternative embodiment. In a economized version of the nonvibrating conduit inertia force flowmeter, one each of each of the two pairs of motion sensors 14 and 15, and 16 and 17, as well as the signal combining amplifiers may be omitted, and the preamplifiers amplifying the two alternating electrical signals respectively provided by two single motion sensors may be incorporated into the two band pass filters 24 and 25, respectively.

In FIG. 4 there is illustrated an embodiment of the vibration sensor usable in the construction of the nonvibrating conduit inertia force flowmeter. The planar member 41 under the torsional vibration about the center line 42 of the flow passage 43 may include a pair of lateral extensions 44 and 45 in a relationship wherein the cross section of the combination of the planar member 41 and the pair of lateral extensions 44 and 45 has a shape of a cross with the center coinciding with the center line 42 of the flow passage 43. The vibration or motion sensor converting the torsional vibration of the planar member 41 to an alternating electrical signal comprises a piezo electric transducer, that includes a magnetized stress transmitting member 46 extending from a thin end wall 47 of the transducer container vessel 48. A piezo electric disc element 49 disposed within the transducer container vessel 48 in a compressed relationship to the thin end wall 47 has two pairs of electrodes respectively in contact with two opposite faces of the piezo electric disc element 49, wherein two electrodes included in each of the two pairs of electrodes are respectively located on two opposite sides of a reference plane parallel to the center line 42 of the flow passage 43 and including the central axis of the stress transmitting member 46. Two electromotive forces respectively supplied by two electrodes respectively in contact with two opposite faces of the piezo electric disc element and respectively located on the two opposite sides of the reference plane are combined into an alternating electrical signal representing the torsional vibration of the planar member by a pair of amplifiers 50 and 51 with a signal level balancing device 52 therebetween. At least one side edge of the planar member 41 adjacent to the piezo electric vibration or motion sensor, or the entire planar member 41 must be made of a ferromagnetic metal such as a 400 series stainless steel or a carbon steel. In an alternative design, instead of the single piezo electric vibration or motion sensor shown in the particular illustrative embodiment, a pair of piezo electric vibration or motion sensors may be employed in an arrangement similar to that of the pair of inductive motion sensors included in the embodiment shown in FIG. 3, wherein two electromotive forces respectively generated by the two piezo electric vibration sensors are combined into an alternating electrical signal in the same manner as that employing the signal combining amplifiers shown in FIG. 1.

Figures 5, 6, 7:
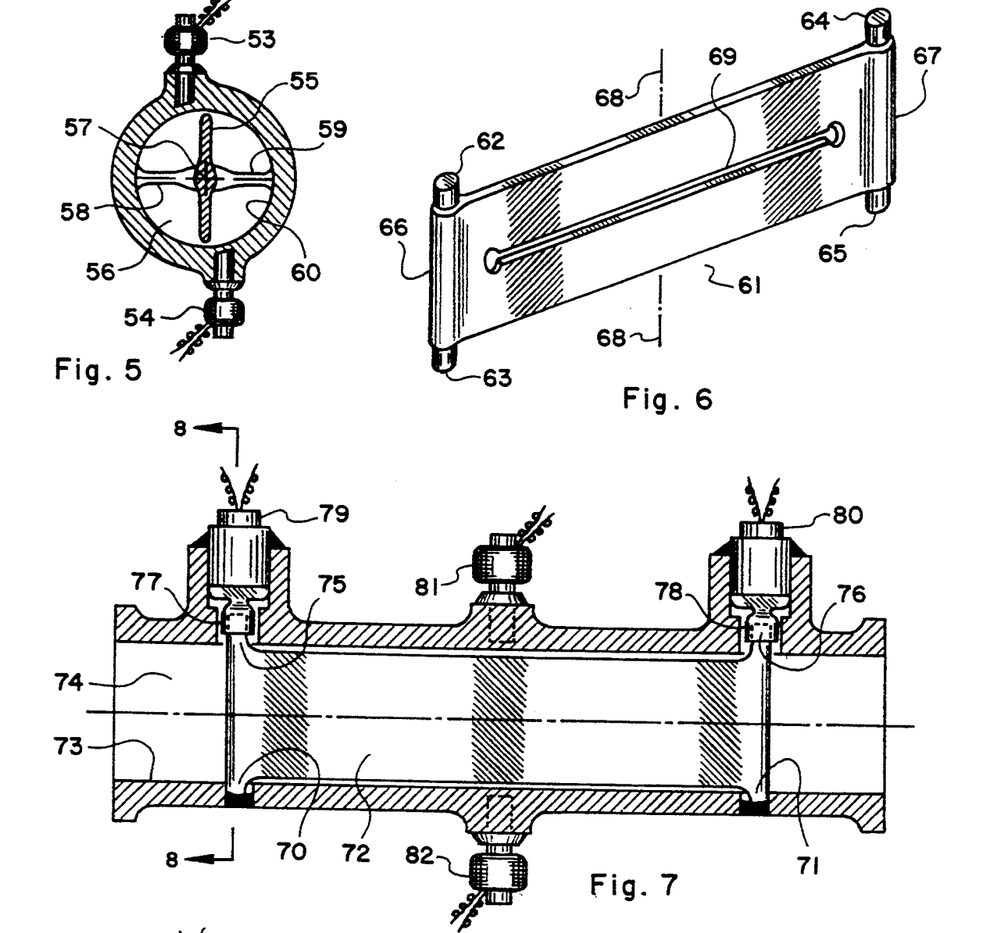
FIG. 5 illustrates a cross section of an embodiment of the electromagnetic vibrator performing the same function as the electromagnetic vibrator shown in FIG. 2.
FIG. 6 illustrates an embodiment of the planar member usable in the construction of the nonvibrating conduit inertia force flowmeter geared for a heavy duty application.
FIG. 7 illustrates a cross section of another embodiment of the nonvibrating conduit inertia force flowmeter of the present invention.

In FIG. 5 there is illustrated an embodiment of the electromagnetic vibrator comprising a pair of electromagnets 53 and 54 which exert alternating magnetic forces onto the two opposite side edges of the planar member 55 dividing the flow passage 56 into two parallel and adjacent subpassages, wherein the two electromagnets 53 and 54 respectively disposed on two opposite sides of a plane including the planar member 55 are simultaneously energized by an alternating electric current with a frequency equal to one half of the natural frequency of the torsional vibration of the planar member 55. Of course, at least the two opposite side edges of the planar member 55 or the entire planar member 55 must be made of a ferromagnetic material. The cross section of the central portion of the planar member 55, whereat the vibrating torque is exerted to the planar member 55 by the electromagnetic vibrator, may include a reinforcing rib of circular cross section with center coinciding with the center line 57 of the flow passage 56, which reinforcing rib is pivotally supported by a supporting structure comprising a pair of pylons 58 and 59 anchored to and extending from the wall 60 of the flow passage 56.

In FIG. 6 there is illustrated an embodiment of the heavy duty planar member 61 playing the same role as the planar member 3 included in the embodiment shown in FIG. 1. The heavy duty planar member 61 has four posts 62, 63, 64 and 65 respectively engaging blind holes included in the wall of the flow passage in securing the leading and trailing edges 66 and 67 of the planar member 61 to the wall of the flow passage. The vibratory torque about the central axis of the planar member 61 coinciding with the center line of the flow passage is exerted to the planar member 61 at the center section 68 thereof. In order to enhance the torsional deflection of the planar member 61, an elongated slit 69 coinciding with the central axis of the planar member 61 is included in the planar member 61 intermediate the leading and trailing edges 66 and 67 thereof. In a modified version of the particular illustrative embodiment, the slit 69 may be closed up at the center section 68 of the planar member 61 in order to enhance the occurrance of the truly torsional vibration of the planar member 61 about the central axis thereof.

In FIG. 7 there is illustrated a cross section of another embodiment of the nonvibrating conduit inertia force flowmeter of the present invention, wherein the leading and trailing edge portions 70 and 71 of the first side edge of the planar member 72 are secured to the wall 73 of the flow passage 74, while the leading and trailing edge portions 75 and 76 of the second side edge of the planar member 72 are respectively supported by the elongated stress transmitting members 77 and 78 of the two piezo electric vibration or stress sensors 79 and 80 rigidly affixed to the wall 73 of the flow passage 74. The vibrating torque about the center line of the flow passage 74 is exerted to the center section of the planar member 72 by an electromagnetic vibrator comprising the electromagnets 81, 82, etc. disposed in an arrangement similar to the combination shown in FIG. 5 or 12. The mass flow rate of media moving through the flow passage 74 is determined as a function of a phase angle difference between two alternating electrical signals respectively provided by the two piezo electric vibration or stress sensors 79 and 80. This particular illustrative embodiment provides an advantage in the construction and operation over the embodiment shown in FIG. 1, as the planar member 72 having a simple rectangular geometry without any protrusions included at the center section thereof provides the torsional vibration thereof without perturbing the convective motion of the media flowing through the flow passage 74 and the two piezo electric vibration sensors 79 and 80 provide the two alternating electrical signals more precisely representing the torsional vibration of the planar member 72 compared with the inductive vibration sensors included in the embodiment shown in FIG. 1.

Figure 8:
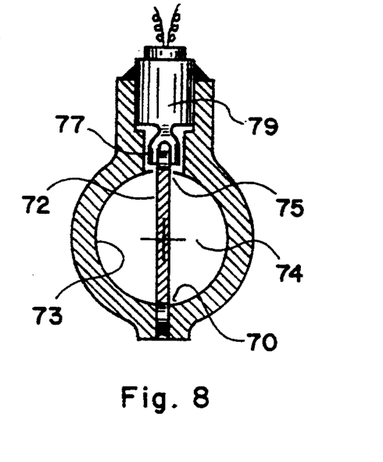
FIG. 8 illustrates another cross section of the nonvibrating conduit inertia force flowmeter shown in FIG. 7.

In FIG. 8 there is illustrated another cross section of the nonvibrating conduit inertia force flowmeter shown in FIG. 7. Each of the two piezo electric vibration or stress sensors 79 and 80 has the same construction as that of the piezo electric motion sensor shown and described in conjunction with FIG. 4 with one exception being that the magnetized elongated stress transmitting member 46 of the piezo electric motion sensor shown in FIG. 4 is now replaced by the elongated stress transmitting member 77 or 78 that supports the leading or trailing edge portion 75 of one side edge of the planar member 72 in a relationship preventing any lateral displacement of the leading or trailing edge portion of the planar member 72. The two piezo electric vibration sensors 79 and 80 respectively generate two alternating electrical signals proportional to the bending moments experienced by the planar member 72 respectively at the leading and trailing edges thereof.

Figure 9:
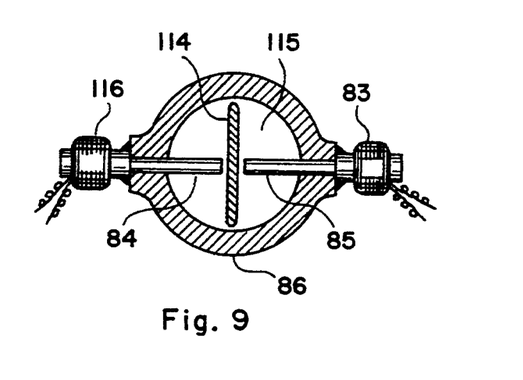
FIG. 9 illustrates a cross section of a further embodiment of the nonvibrating conduit inertia force flowmeter of the present invention.
Figure 10:
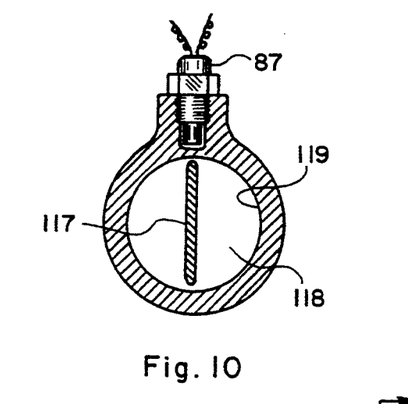
FIG. 10 illustrates another cross section of the nonvibrating conduit inertia force flowmeter shown in FIG. 9.

In FIG. 9 there is illustrated a cross section of a further embodiment of the nonvibrating conduit inertia force flowmeter of the present invention, which embodiment is a modified version of the embodiment shown in FIGS. 1 or 7. In this particular illustrative embodiment, the planar member 114 supported by the wall of the flow passage at the leading and trailing edges thereof and dividing the flow passage 115 into two parallel and equal subpassages is linearly vibrated in directions substantially perpendicular to the planar member 114 rather than torsionally vibrated about the central axis thereof by an electromagnetic vibrator comprising a pair of electromagnets 116 and 83 respectively including the extensions 84 and 85 extending from the wall 86 of the flow passage 115 towards the plane member 114 in two opposite directions, wherein each of the two extensions 84 and 85 has a cross section of a streamlined geometry presenting a minimum resistance against the flow of media moving through the flow passage 115. The combination of the electromagnets 116 and 83 exerts a linear vibratory force acting in directions substantially perpendicular to a plane defined by the planar member 114 instead of the vibratory torque about the central axis of the planar member to the center section of the planar member 114. The two vibration sensors respectively providing the two alternating electrical signals representing the linear flexural vibration of the planar member 114 respectively at two different cross sections of the flow passage 115 may comprise the same pair of vibration sensors as those shown and described in conjunction with FIG. 7, or a pair of inductive motion sensors disposed in an arrangement as shown in FIG. 10. It is readily realized that the linear flexural vibration of the planar member 114 in directions perpendicular thereto can be generated by a combination of two electromagnets such as the elements 33 and 35, or 34 and 36 shown in FIG. 2, or two electromagnets 98 and 99, or 108 and 109 shown in FIG. 12, wherein the two electromagnets are simultaneously energized by an alternating electric current, or by a combination of four electromagnets shown in FIGS. 2 or 12, wherein the two pairs of electromagnets respectively disposed on two opposite sides of the plane defined by the planar member 114 are alternatively energized.

In FIG. 10 there is illustrated an embodiment of the vibration sensor converting the linear flexural vibration of the planar member included in the nonvibrating conduit inertia force flowmeter shown in FIG. 9 to an alternating electrical signal. A vibration or motion sensor 87 of magnetic induction type detects the changing distance between the tip of the vibration sensor 87 and one side edge of the planar member 117 under the linear flexural vibration in accordance with the same priciples as those of the inductive vibration sensors 14 and 15 shown and described in conjunction with FIG. 3.

Figure 11:
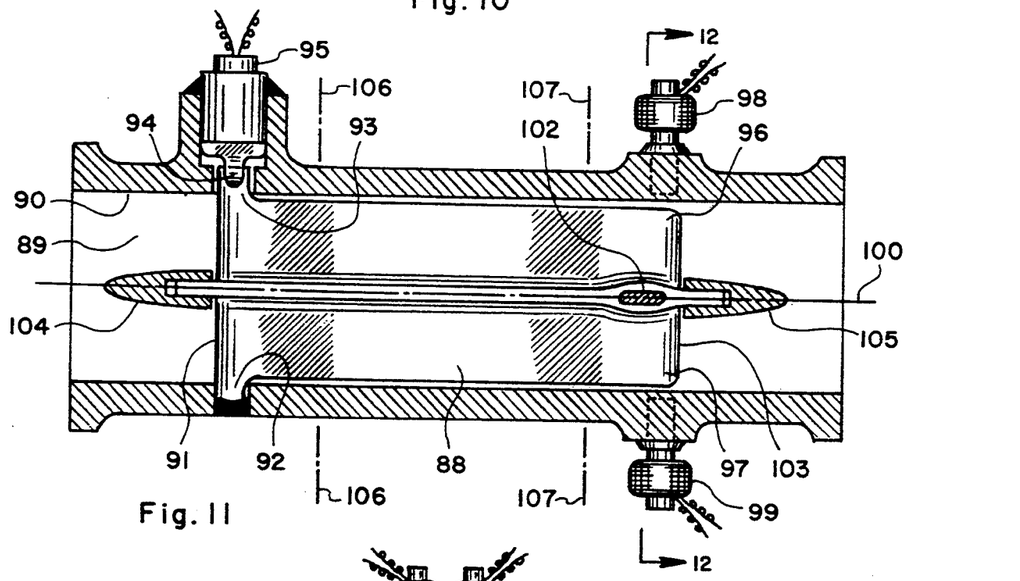
FIG. 11 illustrates a cross section of yet another embodiment of the nonvibrating conduit inertia force flowmeter of the present invention, that comprises the planar member dividing the flow passage into two parallel and equal flow passages secured to the wall of the nonvibrating conduit only at the leading edge of the planar member.

In FIG. 11 there is illustrated a cross section of yet another embodiment of the nonvibrating conduit inertia force flowmeter of the present invention, which embodiment is particularly suited for the construction of the inertia force flowmeters of large port sizes. In this particular illustrative embodiment, the planar member 88 dividing the flow passage 89 into two parallel and equal subpassages is secured to the wall 90 of the flow passage 89 only at the leading edge 91 thereof as far as the supporting of the planar member 88 in a relationship preventing any lateral displacement of the two opposite side edges thereof is concerned, as the leading edge portion 92 of the first side edge of the planar member 88 is secured to the wall 90 of the flow passage 89 and the leading edge portion 93 of the second side edge of the planar member 88 is supported by the elongated stress transmitting member 94 of the piezo electric vibration sensor 95 affixed to the wall 90 of the flow passage 89 in the same manner as the corresponding arrangement shown in FIG. 8. The trailing edge portions of the two opposite side edges 96 and 97 of the planar member 88 are not supported and, consequently, are free of any constraint preventing the torsional vibration of the planar member 88 about the central axis thereof coinciding with the center line of the flow passage 89. The electromagnetic vibrator comprising electromagnets 98, 99, etc. exerts a vibratory torque about the central axis 100 of the planar member 88 to the unsupported trailing edge portion of the planar member 88 and generates the torsional vibration of the planar member 88 about its central axis 100, which torsional vibration is detected by the first piezo electric vibration or stress sensor 95 at a first cross section of the flow passage 89 including the leading edge 91 of the planar member 88, and by a second piezo electric vibration or stress sensor 101 with the elongated stress transmitting member 102 fixedly connected to the planar member 88 at the central axis 100 thereof at a second cross section of the flow passage 89 including the trailing edge 103 of the planar member 88. The mass flow rate of media moving through the flow passage 89 is determined as a function of a phase angle difference between two alternating electrical signals respectively generated by the two vibration sensors 95 and 101. The planar member 88 may be further supported at the central axis 100 thereof by one or both of two journal bearings 104 and 105 in a relationship allowing at least a minute pivotal movement of the planar member 88 about the central axis 100 thereof. The journal bearings 104 and/or 105 ensure that the pivotal vibration of the planar member 88 takes place about the central axis 100, as each of the journal bearings 104 and/or 105 is disposed coaxially to the central axis 100 and secured to the wall 90 of the flow passage 89 by a pair of pylons similar to the elements 58 and 59 included in the embodiment shown in FIG. 5, which pylons extend from the wall 90 of the flow passage 89 and are disposed on a plane generally perpendicular to the planar member 88. In an alternative design, the pair of piezo electric vibration sensors 95 shown in FIG. 11 and 101 shown in FIG. 12 may be replaced by a pair of vibration sensors of magnetic induction types respectively disposed on two cross sections 106 and 107 in an arrangement shown in FIGS. 3, 4 or 10, wherein the leading edge portions 92 and 93 of the two opposite side edges of the planar member 88 are now secured directly to the wall 90 of the flow passage 89. Of course, the supporting of the planar member 88 at the central axis 100 thereof provided by one or both of the two journal bearings 104 and 105 may be omitted in other alternative designs.

Figure 12:
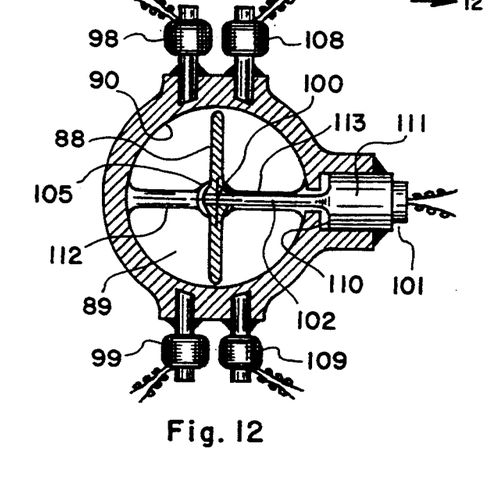
FIG. 12 illustrates another cross section of the nonvibrating conduit inertia force flowmeter shown in FIG. 11.

In FIG. 12 there is illustrated another cross section of the nonvibrating conduit inertia force flowmeter shown in FIG. 11, which cross section taken along plane 12—12 as shown in FIG. 11 illustrates an embodiment of the electromagnetic vibrator and the piezo electric vibration sensor respectively exerting a vibratory torque to and detecting a torsional vibration at the trailing edge portion of the planar member 88. The electromagnetic vibrator comprises four electromagnets 98, 99, 108 and 109, which combination operates in the same manner as that of the combination of four electromagnets included in the embodiment shown and described in conjunction with FIG. 2. In an alternative design, only one of the four electromagnets or only one pair of electromagnets 98 and 109, or 99 and 108 may be retained as explained in conjunction with FIG. 5. The second piezo electric vibration or stress sensor 101 has the eleongated stress transmitting member 102 extending from a thin end wall 110 of the transducer container vessel 111 of the piezo electric vibration sensor 101. The over-hanging extremity of the elongated stress transmitting member 102 is fixedly connected to the trailing edge portion of the planar member 88 at the central axis 100 of the planar member 88, whereby the torsional vibration of the planar member 88 about the central axis 100 thereof induces a bending moment in the elongated stress transmitting member 102 and, consequently, transmits an alternating stress to the thin end wall 110 of the piezo electric vibration sensor 101. In order to detect the torsional vibration of the planar member 88 about the central axis 100 thereof without hindering the torsional vibration, the elongated stress transmitting member 102 must have a cross section of a slender streamlined geometry presenting a minimum obstruction to the flow of the media moving through the flow passage 89. Each of the two journal bearings 104 and 105 is supported by a pair of pylons 112 and 113 having streamlined cross sectional geometry presenting a minimum disturbance in the flow of media. It is readily realized that the embodiment of the nonvibrating conduit inertia force flowmeter shown in FIGS. 11 and 12 may be modified following the modifications shown and described in conjunction with FIGS. 9 and 10. In such a modified version, the supporting of the planar member 88 at the central axis 100 thereof including the two journal bearings 104 and 105 is omitted, and the electromagnetic vibrator exerting the vibratory torque is replaced by an electromagnetic vibrator exerting a linear vibratory force in directions perpendicular to the plane member to the trailing edge portion of the planar member 88. Of course, the piezo electric vibration sensor 101 must be replaced by a piezo electric or inductive motion sensor such as the vibration senor shown and described in conjunction with FIGS. 4 or 10 in the modified version. It is readily recognized that a combination of a single pair of electromagnets 98 and 99 energized in a common mode by an alternating electric current provides an electromagnetic vibrator usable in the construction of the afore-mentioned modified version of the nonvibrating conduit inertia force flowmeter.

The nonvibrating conduit inertia force flowmeter of the present invention can be made to measure the mass flow rate of media occurring at much lower velocities compared with the conventional vibrating conduit inertia force flowmeter, as the amplitude of the torsional or linear flexural vibration of the planar member dividing the flow passage into two subpassages can have a value much greater than the amplitude of the flexural vibration of the entire conduit and, consequently, a greater phase angle difference between the two alternating electrical signals results due to the greater amplitude of the primary mode of vibration of the planar member. Of course, the most important advantage provided by the nonvibrating conduit inertia force flowmeter of the present invention is the realization of the construction of large size inertia force flowmeters of low costs and compact bulks.

While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described, and accordingly, all suitable modifications and equivalents may be regarded as falling within the scope of the inventions as defined by the claims which follow.

The embodiments of the inventions, in which an exclusive property or privilege is claimed, are defined as follows:

1. An apparatus for measuring mass flow rate of media comprising in combination:
   a) a body including a flow passage;
   b) a planar member with a leading and trailing edge and two opposite side edges disposed within the flow passage parallel to a center line of the flow passage, wherein at least a leading edge portion of the planar member is secured to the body;
   c) means for generating a torsional vibratory motion of the planar member about a torsion axis generally parallel to the central axis of the flow passage;
   d) means for generating two alternating electrical signals respectively representing the torsional vibratory motion of the planar member at two different cross sections of the flow passage; and
   e) means for detecting a difference between the two alternating electrical signals as a measure of mass flow rate of media moving through the flow passage.

2. An apparatus as defined in claim 1 wherein said combination includes means for determining mass flow rate of media moving through the conduit as a function of a phase angle difference between the two alternating electrical signals.

3. An apparatus as defined in claim 1 wherein the planar member is supported by a supporting structure secured to the body in a relationship allowing at least a minute pivotal movement of the planar member about the torsion axis.

4. An apparatus as defined in claim 1 wherein said means for generating the two alternating electrical signals comprises two motion sensors detecting the torsional vibratory motion of the planar member respectively at the two different cross sections of the flow passage.

5. An apparatus as defined in claim 1 wherein said means for generating the two alternating electrical signals comprises two stress sensors detecting stresses induced by the torsional vibratory motion of the planar member respectively at the two different cross sections of the flow passage.

6. An apparatus as defined in claim 1 wherein said means for generating the two alternating electrical signals comprises two torsion sensors detecting the torsional vibratory motion of the planar member respectively at the two different cross section of the flow passage.

7. An apparatus as defined in claim 1 wherein said combination includes at least one additional planar member disposed parallel to the center line of the flow passage and connected to said a planar member in a relationship having a cross sectional geometry of a radially extending pattern from the torsion axis.

8. An apparatus as defined in claim 7 wherein said combination includes means for determining mass flow rate of media moving through the flow passage as a function of a phase angle difference between the two alternating electrical signals.

9. An apparatus as defined in claim 7 wherein said a and additional planar members are supported by a supporting structure secured to the body in a relationship allowing at least a minute pivotal movement of said a and additional planar members about the torsion axis.

10. An apparatus as defined in claim 7 wherein said means for generating the two alternating electrical signals comprises two motion sensors detecting the torsional vibratory motion of said a planar member respectively at the two different cross sections of the flow passage.

11. An apparatus as defined in claim 7 wherein said means for generating the two alternating electrical signals comprises two stress sensors detecting stresses induced by the torsional vibratory motion of said a planar member respectively at the two different cross sections of the flow passage.

12. An apparatus as defined in claim 1 wherein a trailing edge portion of the planar member is also secured to the body, and said means for generating the torsional vibratory motion exerts a vibratory torque about the torsion axis onto a center section of the planar member intermediate the leading and trailing edges of the planar member.

13. An apparatus as defined in claim 12 wherein said combination includes means for determining mass flow rate of media moving through the flow passage as a function of a phase angle difference between the two alternating electrical signals.

14. An apparatus as defined in claim 12 wherein said combination includes at least one additional planar member disposed parallel to the center line of the flow passage and connected to said a planar member in a relationship having a cross sectional geometry of a radially extending pattern from the torsion axis.

15. An apparatus as defined in claim 12 wherein said means for generating two alternating electrical signals comprises two motion sensors detecting the torsional vibratory motion of the planar member respectively at the two different cross sections of the flow passage.

16. An apparatus as defined in claim 12 wherein said means for generating the two alternating electrical signals comprises two stress sensors detecting stresses induced by the torsional vibratory motion of the planar member respectively at the two different cross sections of the flow passage.

17. An apparatus for measuring mass flow rate of media comprising in combination:
   a) a body including a flow passage;
   b) a planar member with a leading and trailing edge and two opposite side edges disposed within the flow passage parallel to a center line of the flow passage, wherein at least a leading edge portion of the planar member is secured to the body;
   c) at least one electromagnetic vibrator comprising an electric coil wound on a core having an extension extending from a wall of the flow passage towards the planar member and terminated at a close proximity to the planar member, wherein said electromagnetic vibrator exerts a vibratory force onto the planar member and generates a linear flexural vibration of the planar member in directions generally perpendicular to the planar member;
   d) two vibratory motion sensors detecting the linear flexural vibration of the planar member respectively at two different cross sections of the flow passage; and
   e) means for detecting a difference between two alternating electrical signals respectively generated by the two vibratory motion sensors as a measure of mass flow rate of media moving through the conduit.

18. An apparatus as defined in claim 17 wherein said combination includes means for determining mass flow rate of media moving through the flow passage as a function of a phase angle difference between the two alternating electrical signals.

19. An apparatus as defined in claim 17 wherein a trailing edge portion of the planar member is also secured to the body, and the electromagnetic vibrator exerts the vibratory force onto a center section of the planar member intermediate the leading and trailing edges of the planar member.

20. An apparatus as defined in claim 19 wherein said combination includes means for determining mass flow rate of media moving through the flow passage as a function of a phase angle difference between the two alternating electrical signals.

* * * * *